United States Patent [19]
Cates, Jr. et al.

[11] 3,986,624
[45] Oct. 19, 1976

[54] DISPOSAL FEEDING SYSTEM INCLUDING SELECTIVE CONTAINER CONTROL

[75] Inventors: Henry J. Cates, Jr., De Kalb County, near Atlanta; Tom Rosenberg, East Point; Harvey E. Entrekin, Dalton, all of Ga.

[73] Assignee: International Incinerators, Inc., Atlanta, Ga.

[22] Filed: Nov. 16, 1973

[21] Appl. No.: 416,627

Related U.S. Application Data

[62] Division of Ser. No. 115,486, Feb. 12, 1971.

[52] U.S. Cl. .................................................. 214/23
[51] Int. Cl.² ...................... F23G 7/00; B65G 47/82
[58] Field of Search............ 214/18 R, 23, 312, 313, 214/314; 110/101 R

[56] References Cited
UNITED STATES PATENTS

| | | | |
|---|---|---|---|
| 3,598,258 | 8/1971 | Grewer | 214/35 R |
| 3,709,386 | 1/1973 | Jones | 214/23 |

*Primary Examiner*—Robert G. Sheridan
*Attorney, Agent, or Firm*—Patrick F. Henry

[57] ABSTRACT

A system including apparatus for automatically and continuously, or intermittently, feeding disposal material such as highly combustible waste plastic in containers such as 55 gallon steel drums or in packages such as 30 gallon sizes into a rotary kiln or any other appropriate receiver. Highly combustible or explosive materials must be placed carefully into a rotary kiln or other type of combustible disposal equipment because of the likelihood of explosion or blow back when the material reaches the heat. Such material contained in packages of 55 gallon steel drums or in bales or disposable cartons is delivered by conveyor to a grid for raising same and in clamping means which holds the reclaimable drum and tilts same through an openable closure into the furnace or incinerator, dumps the container and returns it to reclaimable position to be moved on out another conveyor system. The system comprises basically four components, some of which may be eliminated or substituted: (1) four roller conveyors (2) a dumping grid (3) a clamping assembly (4) a ram cylinder (5) a feeding grid (optional) (6) an airlock housing, together with suitable electrical and hydraulic control devices. The motor driven conveyors deliver either the drums or self-contained packages to the clamping assembly whereat by automatic operation of the electrical control system the drum or pack is either clamped and dumped or pushed into the furnace and if it is to be clamped and dumped and reclaimed the drum is delivered back down the conveyor system. The operator is at a remote point and may at any time overpower the system by electrical control and buttons to interrupt the process or otherwise control the outcome.

12 Claims, 8 Drawing Figures

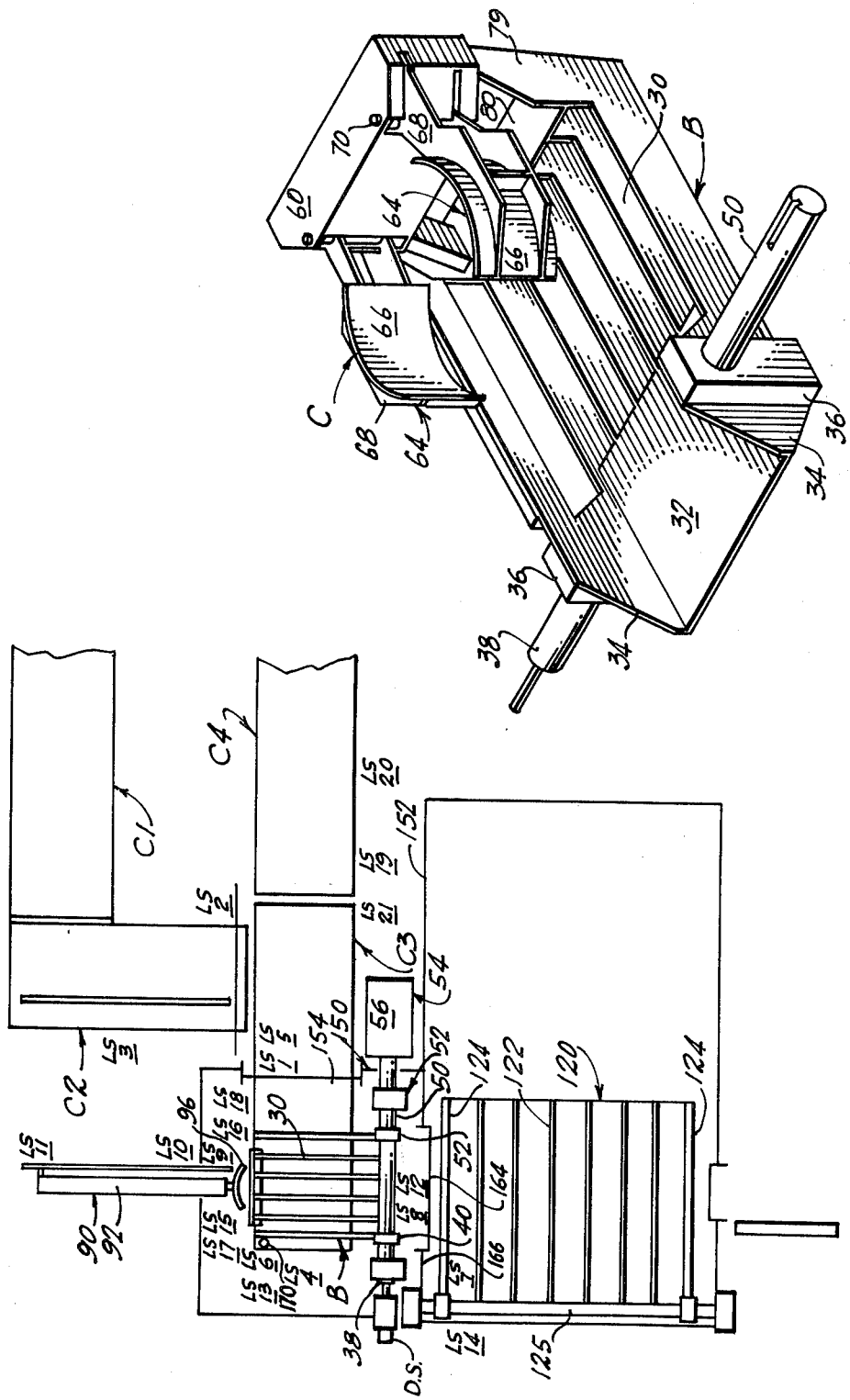

DISPOSAL FEEDING SYSTEM INCLUDING SELECTIVE CONTAINER CONTROL

This is a division of application Ser. No. 115,486 filed Feb. 12, 1971.

BACKGROUND OF THE INVENTION

1. Field of the Invention

Delivery systems and apparatus for incinerators and explosion-proof furnaces. Automatic incineration equipment and delivery equipment for highly combustible materials to furnaces and incinerators.

2. Description of the Prior Art

The prior art includes U.S. Pat. No. 3,173,389 issued to Henry J. Cates, Jr., et al providing explosion-proof closures and delivery systems for furnaces to handle highly combustible material. This system is fine for its purpose but does not include any way of conveying the combustible material into the furnace other than to move it through the explosion-proof doors nor is there any effort for handling drums and similar containers and retaining and reclaiming the drum or for selectively dumping packages and in case of emergency the drum itself. There is a need for such an arrangement where continuous quantities of highly combustible material such as plastic waste and other combustibles are being produced, as for example in industry, where waste plastic results from manufacturing processes. While conveyor systems per se are well known, the present arrangement handles the material and may be automatic insofar as handling the reclaimable drum or the package of waste material and also may be remotely controlled by an operator who observes and controls the procedure. Previously there has been a problem in handling highly combustible materials at the point where the material is released to the furnace because this is where sudden explosion or combustion may take place before handlers are out of the way.

SUMMARY OF THE INVENTION

The system which may be electrically controlled and hydraulically operated, includes conveyor means delivering packages which may be in containers, such as drums, to the container or package grasping assembly which includes clamping and non-clamping operation and a quick means for dumping the entire package. The grasping means is operated in the electrical circuit to clamp and tilt a drum through the normally closed explosion proof closure into the incinerator or furnace and to return the drum to a conveyor means to be conveyed away for reuse. The grasping assembly is mounted with a portion of the conveyor system so as to move relative thereto and lift the container or package of waste material for dumping or for feeding. Handling of the drums is automatic and remote from any operator so that explosions or blowbacks should not injure personnel. Furthermore, there is a provision for releasing the drum or package should any emergency arise but normally the drum is reclaimed and reused and all of this is done continuously and in a regulated orderly pattern through an automated electrical control system handled by one operator.

Brief Description of the Drawings

FIG. 5 is a plan view partly diagrammatic of the clamping assembly and the dumping assembly.

FIG. 6 is a perspective view of the clamping assembly.

DESCRIPTION OF THE PREFERRED EMBODIMENT

Figure 1:
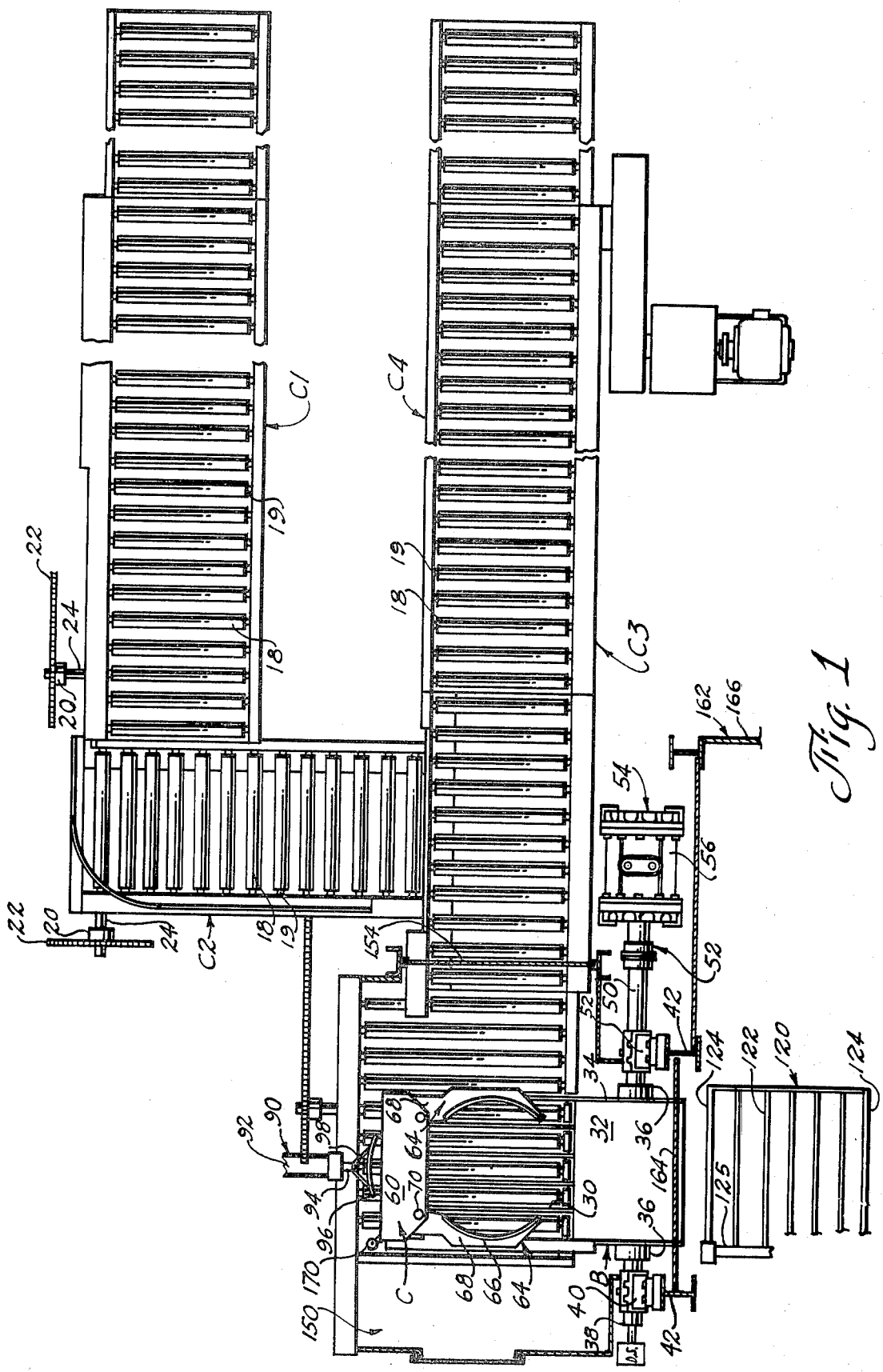
FIG. 1 is a plan view of the complete system.
Figure 2:
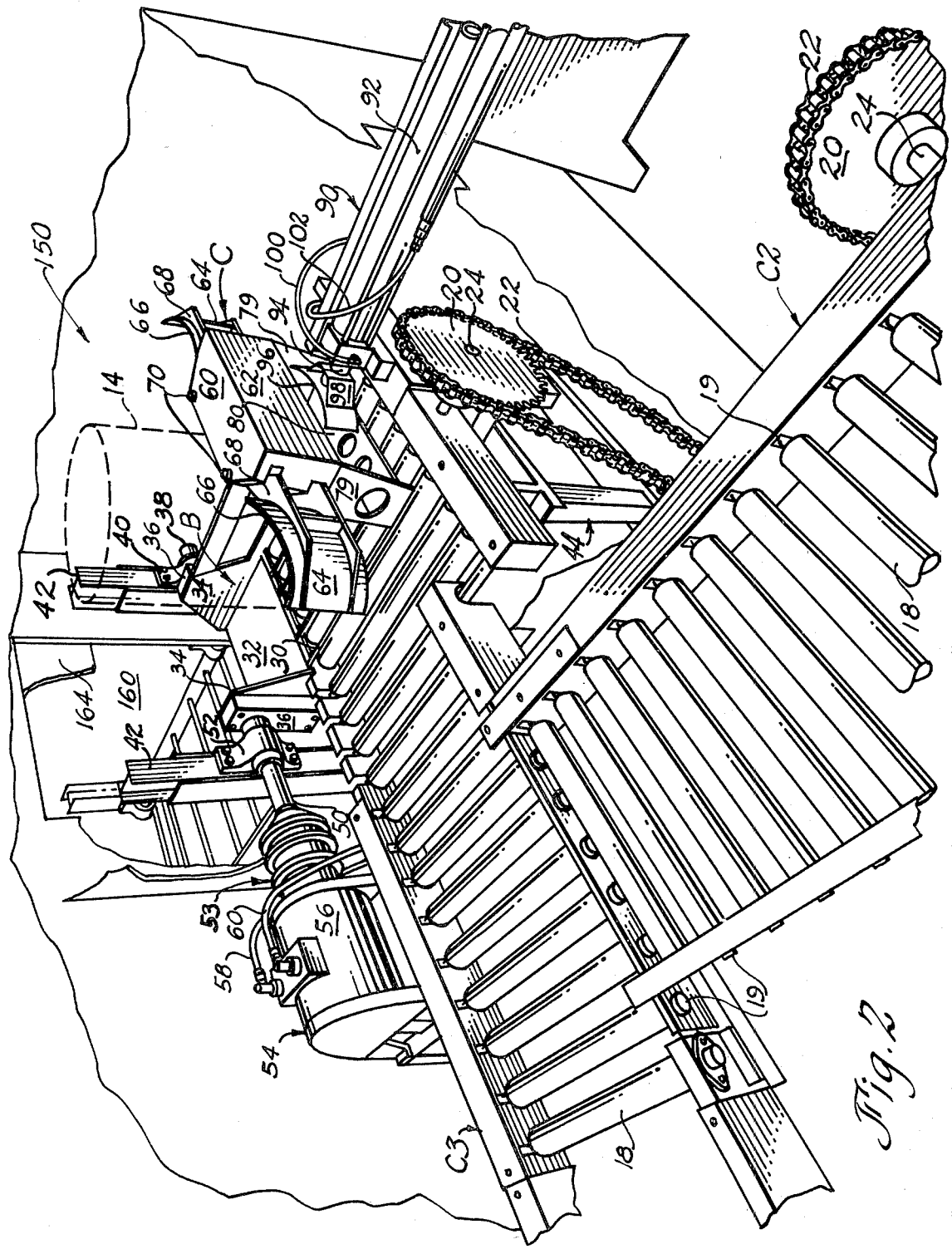
FIG. 2 is a perspective view of the clamping and dumping grid component of the system and part of the conveyors.
Figure 3:
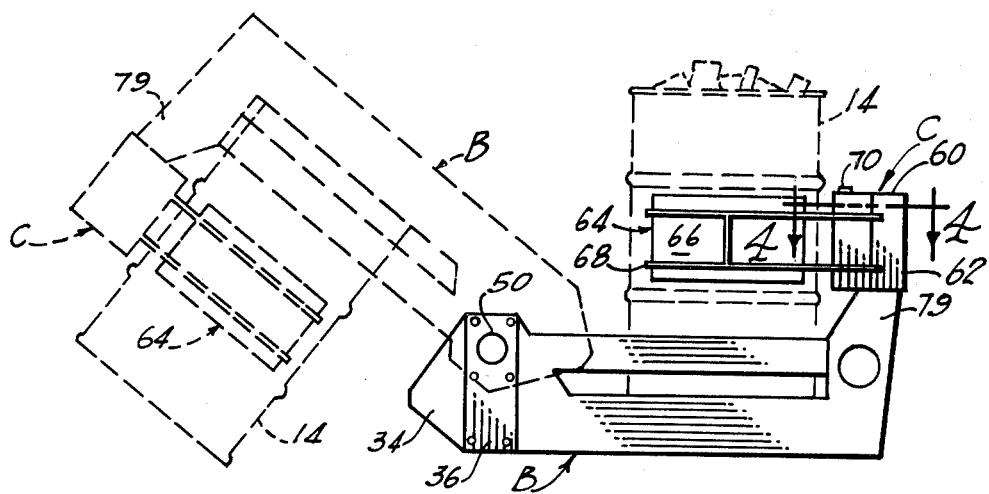
FIG. 3 is a side elevation view of the clamping and dumping mechanism with a drum in place.

The present system and preferred embodiment is designed to automatically and continuously feed 55 gallon steel drums and/or 30 gallon packs into a furnace or kiln such as the International Incinerators, Inc. Rotary Kiln. The system is also designed so that it will either feed the container such as a 55 gallon steel drum and its contents into the kiln (dumpable cycle) or dump the contents and retain the container (reclaimable). However, the operator has control of the system at all times and at the operator's option on the reclaimable cycle, by pushing a button the container can be dumped should there be any reason such as an emergency or a fire in the container and the like.

The complete system comprises basically the following components some of which as more readily appear to one who has ordinary skill in the art may be eliminated or replaced by something else such as a chain hoist conveyor, a forklift truck, and so forth:

A. Four Roller Conveyors C1, C2, C3 and C4
B. The Dumping Grid;
C. The Clamping Assembly;
D. The Ram Cylinder;
E. The Feeding Grid;
F. The Air Lock Housing;
G. Electrical and Hydraulic Control Devices.

The four conveyors are each essentially conventional equipment and are either powered or non-powered roller conveyors as will appear hereinafter identified as conveyors C1, C2, C3 and C4.

Conveyor C1 consists of one eight foot long section of free rollers 18 to allow time for the removal of the lids from the drums 14, one 20 foot long section of cam clutched rollers, and a four foot long section of powered rollers. A cam clutched roller is one with a one-way clutch that can be overridden. After the lids (not shown) are removed from the drums 14 the drums 14 are pushed onto the cam clutched roller area.

Conveyor C2 is a short conveyor that transfers the drums 14 one at a time from the conveyor arrangement C1 to the conveyor C3 as the feeding sequence calls for a new drum 14. As conveyor C2 calls for drum 14 the powered section of conveyor C1 moves the drum onto the conveyor C2.

Conveyor C1, C2, C3, and C4 are of conventional construction using steel rollers 18 mounted on respective end shafts 19 in the end of each roller and the power driven rollers 18 are powered by means of a sprocket and chain drive. The power driven rollers are driven by the sprocket 20 which is driven by a chain 22 from a motor drive (not shown) to drive the shaft 24 coupled to one of the powered rollers 18 to the shaft thereof and the rollers in sequence in that powered section are interconnected by means of respective sprockets and chains which transfer the power from one roller to another. Similarly conveyor C2 is powered from a sprocket 20, chain 22 through a shaft 24 and conveyor C3 is likewise powered. Conveyor C2 is a short conveyor that transfers drums one at a time from conveyor C1 to C3 as the feeding sequence calls for a new drum and all the rollers 18 on C2 are powered.

C3 is an all powered roller conveyor that receives a drum 14 on one end from C2 and conveys it to the proper stopping point for the dumping operation and then if the empty drum 14 is to be returned C3 reverses and carries the empty drum 14 to C4.

C4 receives the empty drums 14 from C3 and intermittently moves each one down approximately 3 feet and then stops. C4 is an all powered roller conveyor except for an eight foot section on the end of free rollers 18 for the purpose of replacing the lids.

B. THE DUMPING GRID

The dumping grid B is a hydraulically actuated pivoting device consisting of six bar fingers 30 which are flat plates connected to a larger plate surface 32 which has triangular steel plates 34 on each side thereof each of which has bolted thereto a large steel block 36. A floating shaft 38 attached to the steel block 36 on one side of the dumping grid triangular plate 34 pivots in a journal bearing assembly 52 mounted on a steel I beam 42 which is rigidly supported on the frame of the building or the floor or otherwise supported as part of the framework designated generally by reference numeral 44 which supports all of the conveyors C1, C2, C3, and C4 as well as the other parts of the system.

The other triangular plate 34 of the dumping grid B and block 36 is attached to the drive shaft 50 mounted in a bearing block assembly 52. Drive shaft 50 is connected to the coupling assembly 52 of a "ROTAC" (rotary actuator) assembly designated generally by reference numeral 54 and comprising hydraulic motor 56 receiving fluid through lines 58, 60 to operate through the coupling 53 shaft 50 thereby pivoting the entire dumping grid assembly B in the bearings 40, 52 to bring the fingers 30 out from between respective conveyor rollers 18 for the purpose of dumping the drum 14.

C. THE CLAMPING ASSEMBLY

Figure 4:
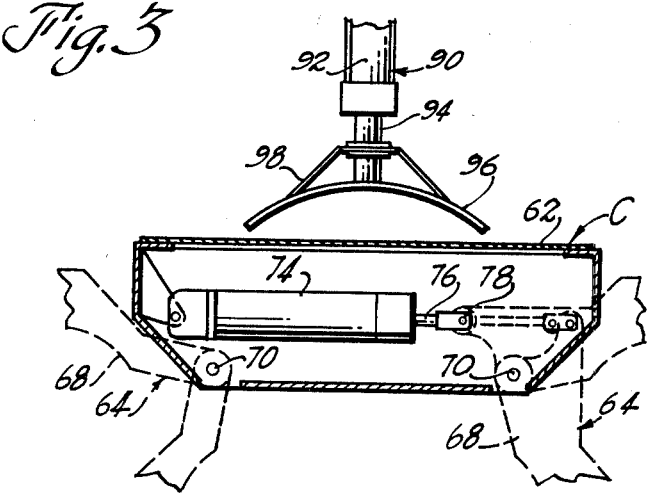
FIG. 4 is a cross-sectional view taken substantially along lines 4—4 in FIG. 3 through the clamping mechanism.

In order to hold the drum 14 for dumping and to be reclaimed after dumping there is mounted as part of and with the dumping grid assembly B the clamping assembly C comprising a housing constructed from steel plate 60, 62 into a box-like arrangement and having a pair of clamp arms 64 made from curved steel plates 66 reinforced by back plates 68. Reference to FIG. 4 discloses that each clamp arm 64 is supported on the box-like housing on pivots 70 which are shafts supported vertically in the housing made up of plate 60, 62 and a respective hydraulic cylinder 74 has a cylinder rod 76 connected to a pivot pin 78 on one end of each clamp arm 64 whereby actuation of the hydraulic cylinder moves the rod 76 to open and close each respective clamp 64 on a respective drum 14. The entire clamp assembly is attached to the fingers 30 by means of trust plates 79 vertically disposed and attached to a horizontal connecting plate 80 all of which are welded or otherwise secured in place.

The dumping grid B along with the clamping assembly C is a hydraulically actuated pivoting device which serves to:
1. lift a pack or drum off the rollers for either the dumpable cycle or the reclaimable cycle;
2. provide a level surface to push the paks or drums 14 across with the ram cylinder D to be described next on the dumpable cycle;
3. lift and rotate the drum 14 and clamping assembly during the reclaimable cycle.

D. THE RAM CYLINDER

Ram cylinder 90 designated in complete assembly is a hydraulic cylinder 92 especially designed so as not to allow twisting of its shaft 94 and on which shaft 94 there is a curved pushing plate 96 made of steel and attached by means of a truss arrangement 98 to the hydraulic cylinder rod 94. The curved plate 96 fits the contour of the drum 14 and pushes a drum across the surface of the fingers 30 and the plate 32 of the dumping grid onto the feeding grid 120 during the dumpable cycle (which is the terminology used to indicate the abandonment of a drum or pak - as opposed to retaining a container, dumping same and returning it for reuse). Hydraulic cylinder 92 is operated by means of hydraulic lines 100, 102.

E. THE FEEDING GRID

The feeding grid designated generally by reference numeral 120 is another finger type grid comprising flat plate fingers 122 connected by peripheral plates 124 into a box-like structure which is supported horizontally on a shaft 125 which is perpendicular to the dumping grid shaft 50. The feeding grid 120 works during the dumpable cycle and accepts a pak or a drum in the upright position which is pushed by the curved plate 96 by the rod 94 and slowly lowers the pak or drum 14 to a 45 degree angle from vertical thus causing the pak or drum 14 to enter the kiln, incinerator or furnace bottom first and at a controlled rate of speed. By entering bottom first in the case of a drum the contents are not dumped suddenly to be ignited and the pak or drum is allowed to fall into the incinerator.

F. THE AIR LOCK HOUSING

The air lock housing designated generally by reference numeral 150 is a reinforced steel plate housing which is mounted in the wall structure 152 that separates the dumping grid B from the furnace or incinerator. The air lock housing includes a hydraulically operated guillotine type door 154 that when closed forms an air seal around the pak or drum 14 in feeding position. The access opening 160 in a feeder housing 162 is opened by opening the access door 164 which normally closes the opening 160 which exposes the feeding grid 120. The feeder housing 162 is constructed from steel plate wall members 166 arranged in a closed box-like formation and has an opening in the roof (not shown) to allow a vent (not shown) to the outside of building in case of an explosion and the vent also serves as an air inlet through a damper and an air inlet duct (not shown). The door 164 will only open when the door 154 of the air lock housing is closed.

A grid jack cylinder 170 may be located beneath the dumping grid B for the purpose of providing initial lifting force to jack the dumping grid B positively so as to remove some of the force required through torque in the shaft 50. Cylinder 170 is mounted on a conveyor frame C3 and the cylinder rod is connected to grid B. Cylinder 170 drives grid B to assure level each time.

Energizing Conveyor C3 forward (C-3F) by-passes L.S.-2 on Conveyor C2 and causes the drum at the index point to move on to Conveyor C3. At the same time another C-3F interlocking contact stops Conveyor C1 so that only one drum 14 at a time will move into the air lock housing 162. When the C-3F coil is de-energized, Conveyors 1 and 2 resume their automatic cycle and move another pak or drum to the index point.

LEGEND
RELAY
SOLENOID COIL

| | |
|---|---|
| SSW | Selector Switch |
| C.R. | Control Relay |
| L.S. | Limit Switch |
| P.B. | Push Button |
| D.S. | Drum Switch |
| T | Timer |
| C | Conveyor |
| F | Forward |
| R | Reverse |
| S.W. | Switch |

LIMIT SWITCH SCHEDULE (LS)

| SW. No. | INDICATES | CONTACTS | |
|---|---|---|---|
| LS.1 | Door 154 is open | 5 N.O. | |
| LS.2 | Drum 14 is at Index Point | | IN.C. |
| LS.3 | A Drum 14 is on Conv. C2 | | IN.C. |
| LS.4 | A Drum 14 is in Dumping Position | IN.O.- | IN.C. |
| LS.5 | Door 154 is closed | IN.O | |
| LS.6 | JACK 170 IS UP | 2N.O | IN.C. |
| LS.7 | FEEDING GRID 120 IS UP | IN.O | |
| LS.8 | DOOR 164 IS OPEN | 2N.O | |
| LS.9 | RAM ROD 94 FULL EXTENDED | IN.O. | |
| LS.10 | RAM ROD 94 IS CLEAR OF DOOR 164 | IN.O. | |
| LS.11 | RAM ROD 94 FULL RETRACTED | IN.O. | |
| LS.12 | DOOR 164 IS CLOSED | IN.O. | |
| LS.13 | JACK 170 IS DOWN | 3N.O | |
| LS.14 | FEEDING GRID 120 IS DOWN | 2N.O | |
| LS.15 | LEFT CLAMP 64 IS OPEN | 1N.O | 1N.C. |
| LS.16 | RIGHT CLAMP 64 IS OPEN | 3N.O. | 1N.C. |
| LS.17 | LEFT CLAMP 64 IS CLOSED | 1N.O. | |
| LS.18 | RIGHT CLAMP 64 IS CLOSED | 1N.O. | |
| LS.19 | DRUM 14 IS OFF CONVEYOR C2 | 1N.O. | |
| LS.20 | STOP CONV.C4 | | 1N.C. |
| LS.21 | START CONVEYOR C4 | 1N.O. | |

DRUM SWITCH (DS)

| POSITION | INDICATES | CONTACTS |
|---|---|---|
| DS 1 | GRID 120 IS IN START POSITION | 4 |
| DS 2 | TOP OF DRUM 14 IS INSIDE DOOR 164 | 1 |
| DS 3 | CLAMPS 64 ARE CLEAR OF DOOR 164 | 4 |
| DS 4 | GRID 64 IN EXTREME STOP POSITION | 1 |
| DS 5 | DRUM 14 IS CLEAR OF DOOR 164 | 1 |

SOLENOID VALVES (S)

| VALVE NO. | FUNCTION | TYPE | COIL A | COIL B |
|---|---|---|---|---|
| S-1 | DOOR 154 | 4-way | Opens | Closes |
| S-2 | GRID JACK 170 | 4-way | Up | Down |
| S-3 | FEEDING GRID 120 | 4-way | Up | Down |
| S-4 | ROTAC FLOAT 54 (Connects Forward Line to reverse line) | 4-way | RETURN | FLOAT |
| S-5 | DUMPING GRID B (ROTAC 54) | 4-way | FORWARD | REVERSE |
| S-6 | ROTAC 54-Power | 4-way | RETURN | ON |
| S-7 | DOOR 164 | 4-way | UP | DOWN |
| S-8 | RAM 90 | 4-way | IN | OUT |
| S-9 | LEFT CLAMP 64 | 4-way | OPEN | CLOSE |
| S-10 | RIGHT CLAMP 64 | 4-way | OPEN | CLOSE |
| S-11 | FEEDING GRID 120 LOCK | 4-way | LOCK | UNLOCK |

Figure 7:
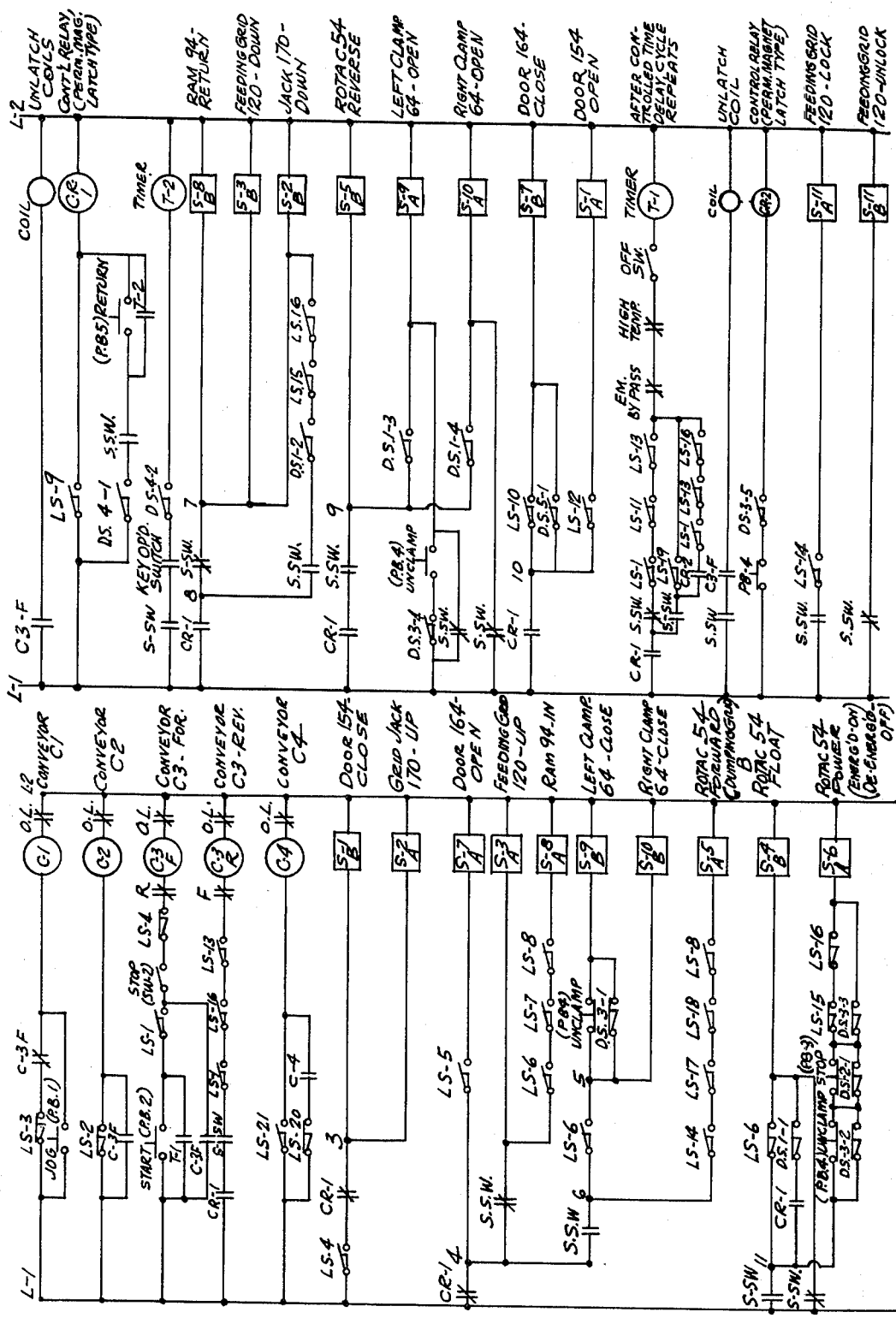
FIG. 7 is an electrical schematic for the complete system.
Figure 8:
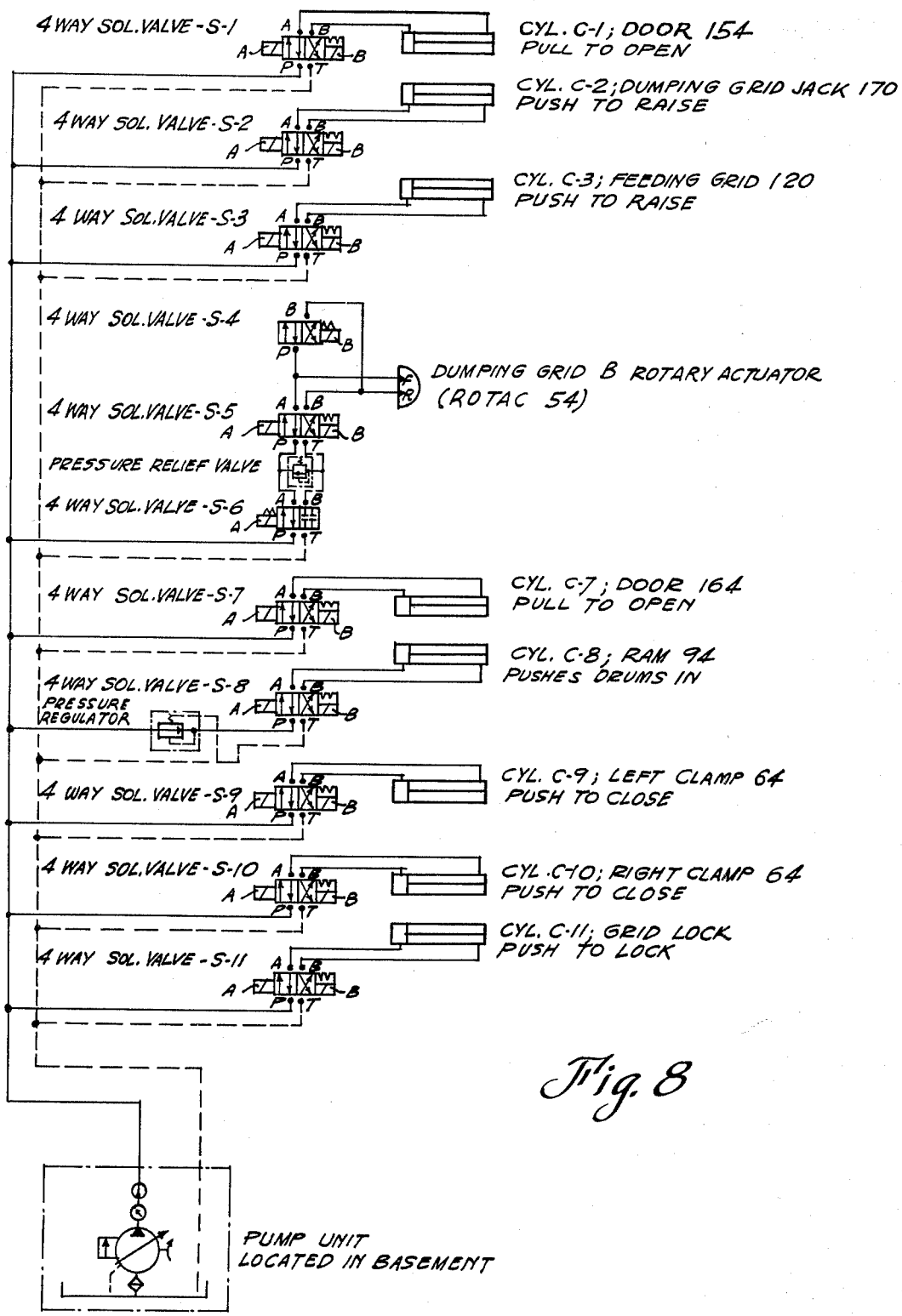
FIG. 8 is a hydraulic schematic for the complete system.

Reference is hereby made to the electrical schematic FIG. 7 and to the hydraulic schematic FIG. 8 which has been labeled according to the above legend. The operational sequence is outlined as follows:

Conveyor C1 and C2 operate independently of the sequence and their only contribution to the sequence is to at all times provide a pak or drum 14 at the index point.

Conveyor C1 will automatically run until a pak 14 or drum 14 is on Conveyor C2 (controlled by L.S.-3). It also has an override "Jog" push button (P.B.-1) so that an operator can manipulate the drums on Conveyor C1 manually.

Conveyor C2 will automatically move the drum 14 that Conveyor C1 provided to the index point.

THE DUMPABLE CYCLE

1. Operator places selector switch (S-SW) on control panel (not shown) C.C.P. in position "Dumpable".
2. Operator turns on sequence timer (T-1) switch and sets rate of feed required.
3. Operator turns on Switch SW-2.
4. Operator presses "Start" Button (P.B.-2)

From this point on sequence is automatic and will continue at this rate until either the sequence timer rate is changed or turned off. In either case, the cycle will not be effected until the drum 14 going through the cycle completes its cycle. If the rate is changed, the next drum 14 will operate at the new speed; if the timer is turned off, there will not be another cycle.

Some of the components used for the reclaimable cycle could, without some special interlocks on the selector switch, cause some interference with the dumpable cycle. Also, a solenoid (S-4) has been provided in the hydraulic circuit for the rotary actuator (ROTAC) S-5 on the dumping grid shaft to connect Port A to Port B so as to allow an auxiliary hydraulic and jack 170 to accurately position the grid 120 for sliding the drum 14 across it. A set of S-SW contacts are used on the dumpable cycle to activate this solenoid during the dumpable cycle.

Another set of S-SW contacts are used on each of the clamping arm solenoids (S-9A and S-9B) to insure that they do not close during this operation.

Pressing the Start Button (P.B.-2) starts (P.B.-2) providing that Door 154 (L.S.-2) is open, (note: Door 154 is left open at the end of each cycle), and that Switch SW-2 is on. An interlock in C-3F also unlatches the reversing relay (CB-1) so that all contacts marked CR-1 and shown normally closed are now closed.

A drum 14 will now transfer from the index point (C2) on to C3 and move to the dumping position where it contacts L.S.-4, L.S.-4 stops C3, closes Door 154 (Sol. S-1B) and raises the dumping grid jack (Sol.-S-2A) up into a horizontal position. As soon as CR-1 unlatched the feeding grid (Sol. S-3A) started raising.

As soon as Door 154 closes, it contacts a limit switch (L.S.-5) and energizes the solenoid (Sol. S-7A) to open Door 164 as soon as Door 164 is full open (L.S.-8) and providing that the grid jack 170 up (L.S.-6) and the feeding grid 120 is up (L.S.-7) the ram cylinder 90 will push the drum across the dumping grid onto the feeding grid.

When the ram cylinder 90 is fully extended, it closes limit switch L.S.-9 which in turn energizes the reversing relay (CR-1).

CR-1 de-energizes all the forward positions of all the solenoids used in this circuit and energizes the circuits used to reverse the procedure. Simultaneously it causes the ram to retract (Sol. S-8B), the feeding grid 120 (Sol. 8-3B) to lower the drum 14 now on it into the furnace, and the grid jack 170 to go down again to receive another drum 14 (Sol. S-2B).

When the ram 96 gets clear of Door 164, it actuates a limit switch (L.S.-10) causing Door 164 (Sol. S-7B) to close.

When Door 164 is fully closed, it actuates a limit switch (L.S.-14) causing Door 154 (Sol. S-1A) to open.

As soon as Door 154 is fully open (L.S.-1) and providing that the ram is fully retracted (L.S.-11) the grid jack 170 is down (L.S.-13), the furnace is not on emergency by-pass and the furnace temperature is not excessive, the sequence timer is energized.

After a time interval, pre-set by the operator, a set of T-1 contacts, wired in parallel with the start button, on C3 starts the cycle over again. the cycle will repeat until the T-1 time switch is turned off.

RECLAIMABLE CYCLE

1. Operator places selector switch (S-SW) on control panel C.C.P. in position (Reclaimable).
2. Operator turns on sequence timer (T-1) switch and sets rate of feed desired.
3. Operator sets key operated switch for timer T-2 on either automatic or semi-automatic.
4. Operator turns on switch SW-2.
5. Operator presses Start Button.

Incorporated in this cycle, the operator has several options that he can perform as he deems necessary. Although the cycle's function is to reclaim 55 gallon steel drums 14, the operator can, if he observes that the drum is not salvagable, unclamp the drum 14 inside the feeder housing 162 and dump it into the kiln. Interlocks (DS-4) are provided on the dumping grid shaft drum switch (DS) so that he can only unclamp the drum inside the feeder housing.

Another option the operator can stop the dumping grid shaft (Sol. S-6A) to visually inspect the drum 14 by pushing the Stop" Button (P.B.-3). Again, interlocks (DS-2) are provided so that he can only stop the dumping grid when the drum is inside the feeder housing. Interlocks (DS-4) are also provided that automatically stop the dumping grid B while unclamping a drum 14.

Unlike the dumpable cycle, the reclaimable cycle can be operated automatically or semi-automatically (T-2 key operated switch). If the switch is set on the semi-automatic position, the operator must press the "Return" Button (P.B.-5) each time a drum 14 is emptied in order to return the drum 14 to C3.

Like the dumpable cycle, pressing the Start Button (P.B.-2) starts C3 providing that Door A (L.S.-2) is open and providing that switch SW-2 is closed. The interlocks in C-3F again de-energized the reversing relay (CR-2) so that all solenoids operate the forward functions.

A drum will now transfer from the index point (C2) onto C3 and move to the dumping position where it contacts L.S.-4. L.S.-4 stops C3, closes Door A (Sol. S-1B) and raises the grid jack (Sol. S-2A) so that the drum is off the rollers. However, because the selector switch is in the reclaimable position, the feeding grid does not raise.

As soon as the dumping grid B is up and has the drum 14 clear of the rollers, it actuates a limit switch (L.S.-6) which in turn causes the left and right clamps 64 (Sol. S-9B) and (S-10B) to clamp the drum 14.

When the clamping operation is going on, Door 154 is closing and as soon as Door 154 is fully closed (L.S.-5) Door 164 (Sol.S-7A) opens.

Again, special selector switch contacts were used to allow the dumping grid B to float while using the auxiliary grid jack cylinder 170. This circuit is broken by a limit switch (L.S.-6) when the jack has the grid B in the proper position.

When Door 164 is fully open (L.S.-8) and the clamps 64 are clamped (L.S.-17) and (L.S.-18) and providing the feeding grid B is locked down out of the way (L.S.-14), the ROTAC 54 solenoid (Sol.S-5A) starts the entire assembly B in a forward arc. As soon as the top of the drum 14 is inside the feeder housing 162 (DS-2), the operator may exercise his option to stop the dumping grid B (P.B.-3).

Also, as soon as the clamps 64 are inside the feeder housing 162 (DS-3), the operator can exercise his option to unclamp the drum 14 (P.B.-4). As was previously mentioned, the operation of unclamping the drum, through an interlock on P.B.-4, stops the assembly and as an added precaution, limit switches (L.S.-15) and (L.S.-16) indicating that the clamps 64 are not clamped also stop the movement of the dumping assembly.

If the operator should choose to unclamp the drum 14, the drum 1r will fall down a chute into the kiln. Then the clamps 64 will close back and the assembly will move on forward to the end of its stroke. However, a set of contacts in the "Unclamp" Button (P.B.-4) energizes a memory relay (CR-2) to start the cycle over again as soon as the system has reset itself.

If the operator does not unclamp or stop the drum 14, the ROTAC 54 unit will rotate the drum to a vertical, upside-down position to dump the contents of the drum 14. This position closes the contacts on the drum switch (DS-4).

If, at this time, the key operated switch is in the "automatic" position, after a 15 second time lapse, the timer (T-2) will energize the reversing relay (CR-1). Or, if the key switch is in the semi-automatic position the operator will have to push the "Return" Button (P.B.-5) and this will energize the reversing relay.

When the reversing relay is energized, power is disconnected from all the forward positions of the solenoids. Then the ROTAC 54 reverses and returns either the dumping assembly with the drum or the empty dumping assembly to Conveyor c3.

As soon as the grid is clear of Door 164 (DS-5), Door 164 closes (SOL. s-7b).

As soon as the grid is back to the horizontal position (DS-1), the clamps 64 unclamp (Sol. S-9A and S-10A).

As soon as the clamps 64 are fully open (L.S.-15) and (L.S.-16) and providing that the dumping grid B is in the proper-position (DS-1), the ROTAC 54 float solenoid (Sol. S-4) again assumes the float position allowing the grid jack 170 (Sol. S-2B) to ease the empty drum 14 (providing there is an empty drum) down on the rollers of C3.

During this reversing and unclamping procedure, Door 164 was closing. As soon as it closed (L.S.-12), Door 154 started opening.

If the drum 14 has been unclamped and the memory relay (CR-2) has been energized as was previously mentioned, then as soon as door 154 is opened (L.S.-1), the grid jack 170 is down (L.S.-13) and the right clamp is open (L.S.-16), a set of CR-2 contacts complete the circuit to the sequence timer.

As the empty drum 14 approaches C4, it activates a limit switch (L.S.-21) that starts C4. It then travels across the transfer point onto C4 where it activates two limit switches (L.S.-19) and (L.S.-20).

The second limit switch (L.S.-20) stops C4.

The first limit switch (L.S.-19), providing that the plant is not on emergency by-pass or the temperature in the furnace is not excessive or the timer switch is not turned off, energize the sequence timer (T-1).

Whether the empty drum energizes the timer or memory relay circuit energizes it, after a time interval pre-set by the operator occurs, a set of T-1 contacts wired in parallel with the Start Button on C3 will start the cycle over again. The cycle will repeat until the sequence timer (T-1) switch is turned off.

While we have shown and described a particular embodiment of this disposal feeding system and a method of same this is by way of illustration only and is not a limitation on the scope since various alterations, changes, eliminations, deviations, additions, subtractions, integrations, combinations and departures may be made in the method and apparatus shown without departing from the scope of the invention as defined by a proper interpretation of the appended Claims.

We claim:
1. In a system of the class described:
   a. conveyor means for moving a succession of open containers of disposable combustible material for burning by delivering same to a furnace,
   b. means for grasping said containers including a clamping assembly for clamping same,
   c. a selective means for pushing said container to force same into the furnace for disposal, said means for grasping also dumping said material from the containers and returning said containers to the conveyor means,
   d. a dumping support on which said container is positioned for movement into a furnace comprising a dumping grid device providing a level surface on which a container is supported and across which said container may be pushed,
   e. an actuator for said dumping grid,
   f. an airlock housing having an opening with first closure means leading to said means for grasping,
   g. a second closure means having an opening leading to said furnace or kiln, said airlock housing enclosing said means for grasping so that the first closure means may be opened for loading and then closed and said second closure means may be opened for disposal and then closed after removal of the container,
   h. a selector switch in a control panel,
   i. a sequence timer switch including means for setting the rate of delivery of successive containers for dumping,
   j. a solenoid control for controlling the movement of the dumping grid,
   k. electrically controlled, hydraulic control means for said first door,
   l. a limit switch contactable by said container to actuate said first door,
   m. hydraulically operated electrical control means for opening the second door and a limit switch operated by said container to actuate same,
   n. a limit switch contacted by said ram assembly when it clears the second door to actuate said limit switch to close said second door,
   o. there being another limit switch contacted by said second door when it is fully closed to cause said first entry door to open whereupon as soon as said door is opened and as soon as said ram rod is fully retracted, said grid is down and the sequence timer is energized for a new cycle.

2. In a system of the class described:
   a. conveyor means for moving a succession of open containers of disposable combustible material for burning by delivering same to a furnace,
   b. means for grasping said containers including a clamping assembly for clamping same,
   c. a selective means for pushing said container to force same into the furnace for disposal, said means for grasping also dumping said material from the containers and returning said containers to the conveyor means,
   d. a dumping support on which said container is positioned for movement into a furnace comprising a dumping grid device providing a level surface on which a container is supported and across which said container may be pushed,
   e. an actuator for said dumping grid, f. an airlock housing having an opening with first closure means leading to said means for grasping,
g. a second closure means having an opening leading to said furnace or kiln, said airlock housing enclosing said means for grasping so that the first closure means may be opened for loading and then closed and said second closure means may be opened for disposal and then closed after removal of the container,
h. a selector switch in a control panel,
i. a sequence timer switch including means for setting the rate of delivery of successive containers for dumping,
j. a solenoid control for controlling the movement of the dumping grid,
k. electrically controlled, hydraulic control means for said first door,
l. a limit switch contactable by said drum to actuate said first door,
m. hydraulically operated electrical control means for opening the second door and a limit switch operated by said drum to actuate same,
n. said dumping grid device comprising a plurality of side-by-side and spaced members to lift and support a container or package from said conveyor,
o. said spaced members providing a level surface on which a container is supported and across which said container may be pushed by the means for disposing of same,
p. a dumping grid jack for initially elevating same to level,
q. there being a solenoid control for said dumping grid jack,
r. solenoid control means for said first and second doors,
s. a limit switch contacted by said drum to stop the conveyor means and to close the first door which raises the dumping grid jack by actuation of the solenoid to a horizontal position,
t. electrical means actuated to cause the feeding grid to raise, said first door contacting a limit switch and energizing the solenoid to open the second door,
u. switch means operated to actuate said ram cyclinder to push a drum, package or container across the dumping grid onto the feeding grid,
v. interlock means operable by the operator if he observes that a drum is not salvagable to unclamp the drum inside the feeder housing and dump it into the kiln including interlock means provided on the dumping grid shaft so that said drum can only be unclamped inside the feeder housing.

3. The device in claim 1: said dumping grid device comprising a plurality of side-by-side and spaced members to lift and support a container from said conveyor.

4. The device in claim 1 wherein: said means for pushing said container comprises a hydraulic ram assembly having a hydraulic cylinder and piston and said clamping assembly having an opening therein through which said ram cylinder piston operates to contact the drum, package or container when it is necessary to completely dispose of same.

5. The device in claim 1 wherein:
said conveyor means includes more than one conveyor having electrically operated power means,
electrical control means for said conveyors including means for operating said conveyors independently of any sequence to provide a package, drum or container at the index point,
one of said conveyors being energized by operation of a limit switch to cause the drum, package or container at an index point to move on to said one conveyor, there being other electrical contacts to stop the conveyor so that only one drum at the time will feed.

6. The system claimed in claim 1:
p. said conveyor means including a first conveyor including power driven rollers and non-powered rollers,
q. a second conveyor leading to the position for grasping said material,
r. a third conveyor being substantially in alignment with said second conveyor for conveying said container from said means for grasping and including power driven rollers thereon.

7. The device claimed in claim 1 wherein said conveyor is a powered roller conveyor that receives the material and conveys it to the proper stopping point for the dumping operation, and including a means for reversing to carry an empty drum or container to be conveyed away.

8. The device claimed in claim 1, wherein: said means for grasping includes a support with a pair of power driven clamps thereon each of which is movable towards and away from the other, and power means for moving said clamp.

9. The device claimed in claim 1 wherein:
there is a feeding grid adjacent the furnace entrance,
said feeding grid being a support means having a plurality of spaced members and being pivoted on a horizontal shaft, said feeding grid pivoting during a dumpable cycle and accepting a pak, drum or container in the upright position and lowering same at an angle from vertical thereby causing the package, drum or container to enter the kiln bottom first and at a controlled rate of speed.

10. The device claimed in claim 1 wherein:
there is a limit switch contacted by the full extension of said ram assembly to energize a reversing relay whereupon all the forward positions of the electrical controls are used to reverse the procedure thereby causing the ram rod to retract.

11. The device claimed in claim 2 wherein:
means for stopping the dumping grid, as for example when the operator visually inspects a container, said means including a stop switch button and interlocks to prevent the actuation of the dumping grid only when the drum is inside the feeder housing and interlocks to prevent motion of the dumping grid while unclamping a drum.

12. The device claimed in claim 11, wherein:
there is a selector switch having a reclaimable position whereby the feeding grid does not raise to receive the drum,
as soon as the dumping grid is up and the drum is clear of the conveyor, a limit switch actuatable thereby causing the left and right clamps to clamp the drum,
switch operable to close the first door and to open the second door,
a special selector switch permitting the dumping grid to float while the auxillary grid jack raises the grid,
limit switch means to stop the movement of said floating grid when the grid is in proper position,
a solenoid means operable when the second door is open and the clamps are in place to start the entire drum clamping assembly in a forward arc, means selectable by the operator when the drum is inside the feeder housing to permit the operator to exercise his option to stop the dumping grid, switch means operating the power unit to rotate the drum to a vertical, upside down position to dump the contents into the furnace thereby closing contacts on a drum switch, timer means energizing a reversing relay after a lapse permitting said drum to dump, switch means disconnecting power from said power means for moving said drum clamping means and to reverse same to starting position, switch means as soon as said second door is closed to unclamp said drum and as soon as said clamps are open solenoid means operable to lower said grid by actuation of said grid jack, switch means operable during the reversing and unclamping procedure to open said furnace door and if the drum has been unclamped and the memory relay has been energized, switch means operating a conveyor to reverse and carry the empty drum away.

* * * * *